3,198,788
N-METHYLOL-α-AMINOBENZYL-PENICILLIN

Edmund Stanley Granatek, Baldwinsville, N.Y., assignor to Bristol-Myers Company, New York, N.Y., a corporation of Delaware
No Drawing. Filed Apr. 1, 1963, Ser. No. 269,807
3 Claims. (Cl. 260—239.1)

This invention relates to a novel and exceptionally useful derivative of α-aminobenzylpenicillin and formulations thereof and, more particularly, to N-methylol-α-aminobenzylpenicillin.

α-Aminobenzylpenicillin (ampicillin) is described in U.S. Patent 2,985,648 and is known to be a penicillin which is therapeutically effective against infections caused by both Gram-positive and Gram-negative organisms. It is used both orally and parenterally but difficulties arise when attempts are made to provide suitable parenteral formulations at the desired concentration of 250–500 mgm./ml. Thus, in aqueous solution or suspension ampicillin is most stable at about pH 5.5 and above about pH 7 the rate of decomposition increases sharply. The solubility of the amphoteric form of ampicillin is very low, i.e., about 7 or 20 mgm./ml. for the trihydrate or anhydrous forms respectively at their natural pH of about 4.4. This means that amphoteric ampicillin can be formulated only as an aqueous suspension; such suspensions cannot be administered intravenously and also are found even on intramuscular injection to give lower initial blood levels than solutions, as of the sodium salt.

The sodium salt of ampicillin has sufficient solubility in water to give a true solution containing 250 or 500 mgm./ml. but the pH of such a solution is between 9.1 and 9.5. This is undesirably high (caustic) for an injectable product and also leads to such rapid decomposition that the solution has a useful life at room temperature of only one hour. It is not possible to retard the decomposition by buffering to lower the pH as below about pH 8.4 the amphoteric form precipitates and the product is, therefore, no longer a true solution suitable for intravenous administration.

It is the object of the present invention to provide a form of ampicillin which upon the addition of water will give a true solution which contains 250–500 mgm./ml. ampicillin, which has a pH close to neutrality and which has a useful life of at least several hours at room temperature.

The object of the present invention has been achieved by the provision, according to the present invention, of a member selected from the group consisting of a compound of the formula

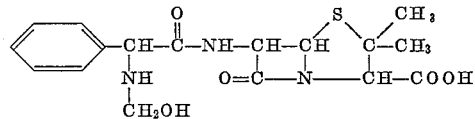

and the alkali metal salts thereof. This amphoteric compound is named N-methylol-α-aminobenzylpenicillin or N-methylol-ampicillin.

The compound of the present invention is prepared, as in the form of its sodium salt, by the reaction of one mole of ampicillin, e.g., as its sodium salt, with at least one mole of formaldehyde (or an equivalent source of formaldehyde such as a polymer thereof) in a liquid medium which is preferably aqueous followed by recovery of the solid product as by lyophilization or by precipitation, e.g., by addition of a water-soluble alcohol such as isopropyl alcohol.

The product of the present invention has a spectrum of antibacterial activity identical to that of ampicillin and is well absorbed and tolerated upon parenteral administration.

The α-aminobenzylpenicillin used to make the compounds of the present invention is preferably of the D-(−) configuration.

The following examples will serve to illustrate the present invention without limiting it thereto.

Example 1

Potassium D-(−)-ampicillin (16.68 g.) was dissolved in 30 ml. water; the pH was 8.7. To this solution there was added 6.6 ml. of 37% aqueous formaldehyde. The mixture was stirred for twenty minutes; the pH was then 6.9. Addition with stirring of 600 ml. isopropyl alcohol precipitated the solid product, potassium N-methylol-α-aminobenzylpenicillin, which was collected by filtration and dried at room temperature in vacuo for 24 hours.

When dissolved in water at 250 mgm./ml. this product gave a solution of pH 7.6 which could be acidified down to pH 5.5 without the formation of a precipitate. The antibacterial activity in vitro of this product was identical to that of D-(−)-α-aminobenzylpenicillin.

Example 2

To potassium D-(−)-α-aminobenzylpenicillin (5.56 g., equivalent to 5.0 g. amphoteric ampicillin) dissolved in 10 cc. water there was added 2.2 ml. 37% aqueous formaldehyde. After mixing 20 minutes the pH was 6.9. The solution was then added to 200 ml. isopropyl alcohol and the precipitate of potassium N-methylol-α-aminobenzylpenicillin was collected by filtration as a white, fluffy solid, dried in a vacuum oven overnight at room temperature and found to weigh 4.95 g.

When 0.5 g. of the product was dissolved in 1 ml. water there was obtained an almost colorless, clear solution of pH 7.55. Upon the gradual addition of 1 N HCl down to pH 4.8 there was obtained a precipitate which quickly redissolved. Below pH 4.8 the solids no longer dissolved and at pH 3.5 the whole mass solidified.

In duplicate ampicillin assays the product assayed 860 mcg./mgm.

After correction for 5.5% volatile material lost in vacuo the product was found by analysis to contain 51.1% carbon, 5.06% hydrogen and 9.7% nitrogen.

The infrared absorption spectrum of this product appeared to be identical with that of ampicillin.

The product contained 6.2% moisture (Karl Fischer) and 9.3% potassium (on a dry basis).

The antibacterial activity (minimum inhibitory concentration) in vitro of this product in Heart Infusion Broth with and without the addition of pooled human serum against a variety of Gram-positive and Gram-negative bacteria was identical to that of D-(−)-α-aminobenzylpenicillin.

Example 3

Repetition of the procedure of Example 2 gave 5.15 g. product assaying 830 mcg./mgm. (theory 835 mcg./mgm.). A solution of pH 7.55 was obtained by dissolving 0.5 g. in 1 ml. water.

Example 4

D-(−)-α-aminobenzylpenicillin (5.0 g.) was slurried in 50 cc. water and dissolved by adjusting the pH to 8 with sodium hydroxide. There was then added 2.15 cc. of 37% aqueous formaldehyde and 0.849 g. acetamide. After mixing 20 minutes the product, sodium N-methylol-D-(−)-α-aminobenzylpenicillin, was precipitated by the addition of isopropyl alcohol, collected by filtration, washed with isopropyl alcohol, vacuum dried 24 hours at 40° C. and found to weigh 1.8 g. and to have a potency in the ampicillin assay of 860 mcg./mgm.

I claim:
1. A member selected from the group consisting of a compound of the formula
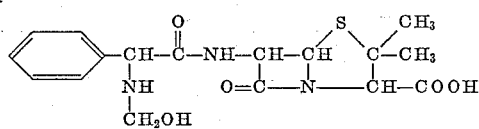
and the alkali metal salts thereof.
2. Potassium N-methylol-α-aminobenzylpenicillin.
3. Sodium N-methylol-α-aminobenzylpenicillin.
References Cited by the Applicant
UNITED STATES PATENTS
2,985,648   5/61   Doyle et al.
NICHOLAS S. RIZZO, *Primary Examiner.*